Figures 1, 2:
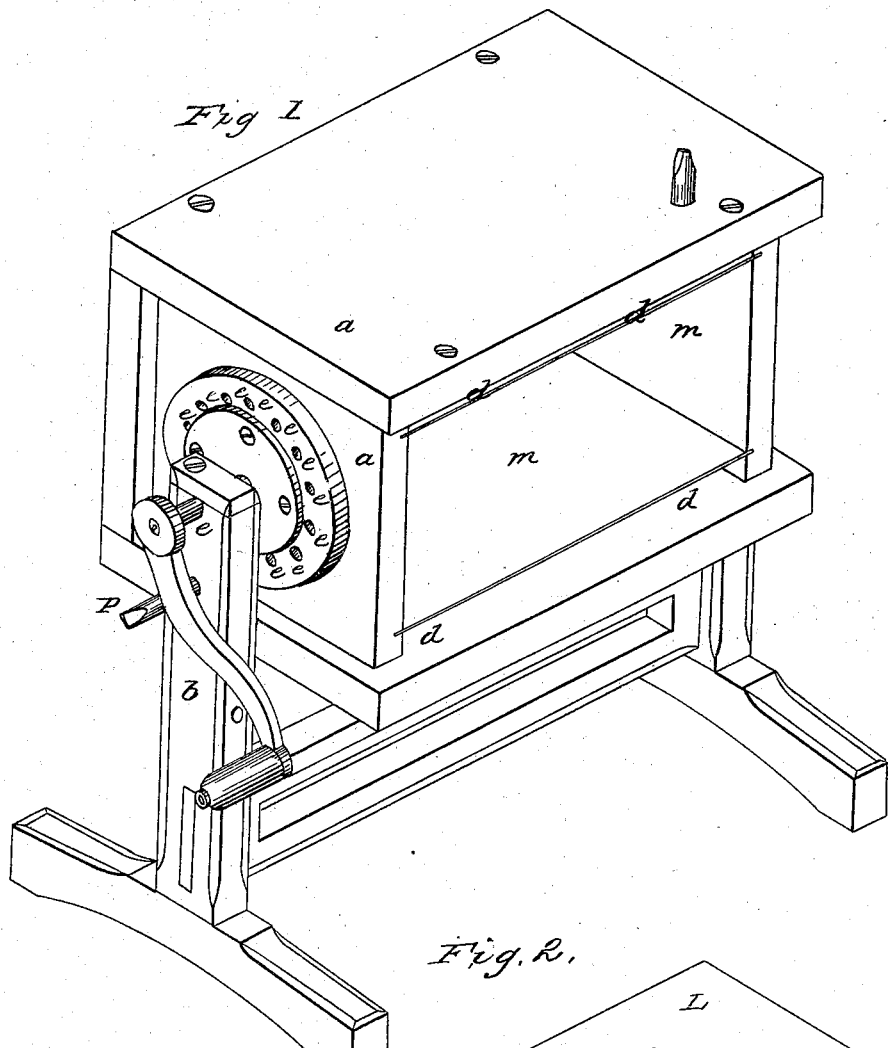

J. MITCHELL.
Churn.

No. 23,186.

Patented March 8, 1859.

Witnesses
John McNall
J. A. Mitchell

Inventor,
Jeremiah Mitchell

UNITED STATES PATENT OFFICE.

JEREMIAH MITCHELL, OF GASPORT, NEW YORK.

CHURN.

Specification of Letters Patent No. 23,186, dated March 8, 1859.

*To all whom it may concern:*

Be it known that I, JEREMIAH MITCHELL, of Gasport, in the county of Niagara and State of New York, have made a new and useful Improvement in Churns, of which the following is a full, clear, and exact description, reference being had to the accompanying drawings, making part of this specification, in which—

Figure 1, represents a perspective view of the churn, with one of the faces removed, and Fig. 2, represents a detached view of the said face, with the door for the introduction of cream into the churn.

The nature of my invention consists in the employment of a revolving box, partially surrounded by a warm or cold water jacket, into which the cream is introduced, and butter made expeditiously without the use of the paddles or dashers as in ordinary churns.

In the drawing, Fig. 1, $a$, represents the square cornered revolving box, suspended by the axis, $c$, the latter being supported by the standards, $b$, $b$. The axis, $c$, does not extend through the box as may be seen by the drawing. The interior of the box is lined with tin or other suitable material, and a water space, $d$, is left between the lining and the outer faces of the churn on three of the sides, there being in addition to the water spaces shown, a similar one behind the back face of the lining $m$. See Fig. 1. There is thus a continuous water space surrounding three of the interior faces of the churn. The water space is intended for the reception of either warm or cold water, dependent on the surrounding temperature, and the degree of heat is rgulated by a thermometer attached to one of the sides of the churn. A faucet connects the water space, with the exterior of the box, for the introduction, or discharge of water, and a faucet is also employed, see, $n$, Fig. 2, for the removal of the buttermilk from the churn. $e$, $e$, are holes made in the side of the box or churn for the reception of a pin, which is made to pass through one of the standards, $b$, and thence into one of the holes, $e$, $e$ thus rendering the churn stationary, when the butter is to be removed, or the interior of the box to be cleansed.

$h$, Fig. 2 is a removable door attached to the face, L, by the buttons, $r$, $r$, or by any other similar device. The door, $h$, is removed for the introduction of the cream, or for cleaning the churn and when replaced is made to fit closely in the face L, in order to prevent the egress of the cream or buttermilk.

The operation of the churn is obvious. The cream is introduced into the interior of the churn through the removable door, $h$, which is then securely fastened by the buttons, $r$, $r$, warm or cold water regulated in temperature by the attached thermometer having been previously introduced into the water jacket. Motion is then given the crank until the butter is formed, after which the box is made stationary for the removal of the butter, by the insertion of the pin $p$, through the standard, $b$, and into one of the holes $e$, $e$, in the side of the box.

The advantages of my churn are numerous; it is extremely simple and economical in its construction; it is easily operated, and from the mode of operation, a uniform and rapid motion of the cream is produced, which will cause the cream to be rapidly converted into butter; much less work is required in cleaning the interior of the churn than in ordinary churns, which arises from the absence of paddles or dashers, and for the latter reason also it is more economical in its first construction, and less liable to get out of order, as in ordinary churns the dashers require more repair than any other parts of the churn. It is also tight and spatters no cream.

Having thus fully described my invention, what I claim as new and desire to secure by Letters Patent is—

The revolving box or churn when constructed and operated substantially in the manner and for the purposes set forth.

JEREMIAH MITCHELL.

Witnesses:
JOHN H. DICKEY,
JOHN McNALL.